United States Patent [19]

Meussdoerffer et al.

[11] 3,906,027

[45] Sept. 16, 1975

[54] N-(PERFLUOROALKYL-SULPHONYL)-CARBAMIC ACID ESTERS OF POLYALKYLENE OXIDES

[75] Inventors: Johann Nikolaus Meussdoerffer, Blecher; Hans Niederpriim, Monheim, Rhineland; Manfred Dahm, Bergisch-Neukirchen, all of Germany

[73] Assignee: Bayer Aktiengesellschaft, Leverkusen, Germany

[22] Filed: July 20, 1973

[21] Appl. No.: 381,313

[30] Foreign Application Priority Data
Aug. 5, 1972 Germany............ 2238740

[52] U.S. Cl.............. 260/468 E; 252/304; 252/380; 260/45.75; 260/470; 260/481 R
[51] Int. Cl.² ............. C07C 143/78; C07C 143/77; C07C 143/75; C07C 143/74
[58] Field of Search............. 260/470, 481 C, 468 E

[56] References Cited
UNITED STATES PATENTS

| | | | |
|---|---|---|---|
| 2,803,656 | 8/1957 | Ahlkrecht et al................... | 260/556 |
| 2,915,554 | 12/1959 | Ahlbrecht et al................... | 260/556 |
| 2,920,994 | 1/1960 | Epperly et al................... | 260/468 E |
| 3,086,986 | 4/1963 | Orthner et al. .................. | 260/481 C |
| 3,357,932 | 12/1967 | Heydkamp et al............. | 260/468 E |
| 3,562,290 | 2/1971 | Fawzi............................. | 260/481 C |
| 3,663,708 | 5/1972 | Harrington.......................... | 260/470 |
| 3,725,451 | 4/1973 | Trancik............................. | 260/470 |
| 3,799,968 | 3/1974 | Harrington et al. ............... | 260/470 |
| 3,840,527 | 10/1974 | Moore et al. ...................... | 260/470 |

OTHER PUBLICATIONS
March, "Advanced Organic Chemistry," McGraw–Hill, N.Y., (1908), p. 335.

*Primary Examiner*—John F. Terapane
*Attorney, Agent, or Firm*—Burgess, Dinklage & Sprung

[57] ABSTRACT

An N-(perfluoroalkyl-sulphonyl)-carbamic acid ester of a polyalkylene oxide of the formula:

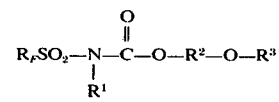

in which:
$R_F$ is a perfluoroalkyl radical of up to 20 carbon atoms,
$R^1$ is hydrogen, alkyl, hydroxyalkyl, cycloalkyl, alkenyl, aralkyl, or

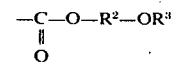

$R^2$ is a polyoxyalkylene radical, and
$R^3$ is alkyl of up to 8 carbon atoms, alkenyl, aralkyl or

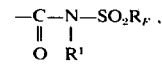

The compounds are produced by reacting a perfluoroalkylsulphonamide with a chloroformic acid ester of a polyalkylene oxide in the presence of an acid binding agent. The products are useful as surfactants in making polyurethane foams.

3 Claims, No Drawings

N-(PERFLUOROALKYL-SULPHONYL)-CARBAMIC ACID ESTERS OF POLYALKYLENE OXIDES

The present invention relates to N-(perfluoroalkylsulfonyl)-carbamic acid esters of polyalkylene oxides and to a process for their production in which primary or secondary perfluoroalkyl sulphoamides are reacted with chloroformic acid esters of the corresponding hydroxy-functional polyethers in the presence of proton acceptors.

U.S. Pat. No. 2,915,554 describes the production of perfluoroalkyl-substituted polyethers, in which the perfluoroalkyl radical is attached to the polyether through an alkylene group.

These compounds are represented by the following general formula:

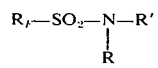

in which:
R$_F$ represents a perfluoroalkyl group having 4 to 12 carbon atoms;
R is either hydrogen, a lower alkyl group or R',
R' is a polyalkoxy group of the following structure:

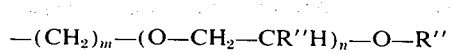

in which:
R'' represents hydrogen or methyl, $m$ is the number 2 or 3 and $n$ a number in the range of from 2 to 20.

Unfortunately, the methods for producing these compounds by condensing ethylene or propylene oxide with correspondingly substituted perfluoroalkyl sulphonamido alkanols in alkali medium or by condensing the sodium salt of a perfluoroalkyl sulphonamide with a polyethylene glycol halide, are attended by considerable disadvantages.

Apart from the unavailability of some of the polyethers used, the extremely long reaction times of up to 16 hours represent a particularly serious disadvantage because decomposition of the sensitive polyether groups can occur at the necessary temperatures. Furthermore, some reactions have to be carried out under pressure with the result that elaborate apparatus have to be used for large-scale working. At the same time, however, compounds with an extremely variable polyether chain structure are also formed. Unfortunately, subsequent purification is not possible.

Polyethers containing perfluoroalkyl groups cannot be directly produced from the correspondingly substituted perfluoroalkyl sulphonamides with cyclic carbonates or sulphites because hydroxy alkylation stops at the primary addition product stage (cf. German Offenlegungsschrift No. 2,024,909).

Accordingly, the object of this invention is to obtain new, non-ionogenic polyethers containing perfluoroalkyl groups through a simple reaction carried out with readily available, inexpensive starting materials.

The present invention relates to an N-(perfluoroalkylsulphonyl)-carbamic acid ester of a polyalkylene oxide of the formula:

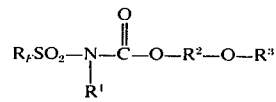

in which:
R$_F$ is a perfluoroalkyl radical of up to 20 carbon atoms,
R$^1$ is hydrogen, alkyl, hydroxyalkyl, cycloalkyl, alkenyl, aralkyl, or

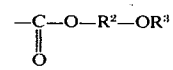

R$^2$ is a polyoxyalkylene radical, and
R$^3$ is alkyl of up to 8 carbon atoms, alkenyl, aralkyl or

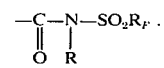

The carbon chain of R$_F$ may be linear, branched or cyclic and preferably is of up to about 8 carbon atoms, e.g. about 4 to 8 carbon atoms. R$^1$ is preferably hydrogen, alkyl of up to about 18 carbon atoms, hydroxy-lower alkyl of up to about 4 carbon atoms, cycloalkyl of 5 or 6 carbon atoms, lower alkenyl of up to about 4 carbon atoms, phenyl-substituted lower alkyl of up to about 4 carbon atoms or lower alkoxy-lower alkyl of up to about 4 carbon atoms in each alkyl radical. R$^2$ is preferably made up of the structural units (—CH$_2$—CH$_2$—O)$_n$ and (—CH$_2$—CHCH$_3$—O)$_m$ wherein $m$ and $n$ are from 0 to about 200 but are not both simultaneously 0; advantageously the sum of $m$ and $n$ is about 2 to 25.

Among these polyethers, those compounds still containing free OH groups are particularly valuable. In the most simple case, R$^1$ is thus hydroxyethyl, —CH$_2$—CH$_2$OH, so that they will undergo reactions with isocyanates and, hence, can be directly incorporated into plastic systems. The hydroxyalkyl-functional perfluoroalkane sulphonamides required for this purpose can be readily obtained in quantitative yields through the reaction of primary perfluoroalkane sulphonamides with cyclic carbonates or sulphites (cf. German Offenlegungsschrift No. 2,024,909).

The perfluoroalkane sulphonamides used as starting materials can readily be obtained by reacting ammonia or primary amines with perfluoroalkane sulphonyl fluorides which can be obtained relatively easily by electrochemical fluorination.

The following are examples of the perfluoroalkyl sulphonamides to be used:
CF$_3$SO$_2$NH$_2$; C$_4$F$_9$SO$_2$NH$_2$; C$_8$F$_{17}$SO$_2$NH$_2$; CF$_3$SO$_2$NH—CH$_3$; CF$_3$SO$_2$NH—C$_3$H$_7$; C$_4$F$_9$SO$_2$NH—C$_4$H$_9$; C$_4$F$_9$SO$_2$NH—CH$_2$—CH=CH$_2$; C$_4$F$_9$SO$_2$NH—C$_6$H$_{11}$; C$_4$F$_9$SO$_2$NH—CH$_2$CH$_2$OCH$_3$; C$_4$F$_9$SO$_2$—NH—CH$_2$C$_6$H$_5$; C$_4$F$_9$SO$_2$NH—C$_{12}$H$_{25}$; C$_8$F$_{17}$SO$_2$NH—C$_2$H$_5$; C$_6$F$_{13}$SO$_2$NH—C$_2$H$_5$; C$_2$F$_5$SO$_2$NH—C$_{18}$H$_{37}$; C$_8$F$_{17}$SO$_2$NH—CH$_3$; C$_8$F$_{17}$SO$_2$NH—CH$_2$CH$_2$OH; C$_4$F$_9$SO$_2$NH—CH$_2$—CH$_2$OH.

The chloroformic acid esters of the hydroxy-functional polyethers can be synthesized from phosgene and alcohol in accordance with the methods generally used for producing chlorocarbonic acid esters.

The following procedure for example can be adopted:

150 g (1.5 moles) of phosgene are dissolved at 0°C in 300 ml of an anhydrous inert solvent, for example, toluene, benzene, chloroform, carbon tetrachloride, chlorobenzene or xylene. The hydroxy-functional polyether (0.7 mole), molecular weight approximately 1450, is also dissolved in the solvent (400 ml), and subsequently completely dehydrated by distilling off approximately 100 ml of the solvent. While cooling with ice, the polyether dissolved in the solvent is quickly added to the phosgene solution. After heating to approximately 25°C, the mixture is stirred for another 4 hours, after which the solvent can be distilled off and most of the excess phosgene and hydrogen chloride formed escapes. Residues of phosgene, hydrogen chloride and solvent are removed by heating in vacuo at a temperature of about 100°C. The hydrolyzable chlorine content of the reaction product is analytically determined by reaction with dibutylamine and back titration with hydrochloric acid.

Reaction of the perfluoroalkyl sulphonamides with the chloroformic acid esters is carried out in inert solvents, for example toluene, benzene or xylene, in the presence of proton acceptors, for example in accordance with the following equations:

Tertiary amines are generally used as the proton acceptors. Examples of suitable proton acceptors are trialkylamines such as triethylamine or tripropylamine, pyridine or picoline.

The reaction is carried out at temperatures in the range of about 10° to 150°C, preferably at the boiling point of the solvent used. Subsequent separation of the deposit precipitated and working up of the reaction mixture are carried out in the usual way.

Among the large number of possible substances according to the invention, the following are mentioned by way of example:

| | average molecular weight |
|---|---|
| $C_4F_9SO_2N(CH_3)-\overset{O}{\overset{\|}{C}}-O-[CH_2-CH_2-O-]_n-C_4H_9$ | 850 |
| $C_4F_9SO_2N(CH_2-CH=CH_2)-\overset{O}{\overset{\|}{C}}-O-[CH_2-CH_2-O-]_n-C_3H_7$ | 870 |
| $C_4F_9SO_2N(CH_2-CH_2OH)-\overset{O}{\overset{\|}{C}}-O-[CH_2-CH_2-O-]_n-C_4H_9$ | 880 |
| $C_8F_{17}SO_2N(CH_3)-\overset{O}{\overset{\|}{C}}-O-[CH_2-CHCH_3O-]_n-[CH_2-CH_2-O]_m-C_4H_9$ | 2000 |
| $C_8F_{17}SO_2N(CH_2-CH=CH_2)-\overset{O}{\overset{\|}{C}}-O-[CH_2-CHCH_3O]_n-[CH_2-CH_2-O]_m-C_4H_9$ | 2050 |
| $C_8F_{17}SO_2N(CH_2-CH_2OH)-\overset{O}{\overset{\|}{C}}-O-[CH_2-CHCH_3O]_n-CH_2-CH_2-O]_m-C_4H_9$ | 2050 |
| $C_8F_{17}SO_2N[\overset{O}{\overset{\|}{C}}-O(CH_2-CHCH_3O)_n-(CH_2-CH_2-O)_m-C_4H_9]_2$ | 3500 |

By virtue of their structure, the compounds obtained in accordance with the invention show surface-active properties and, for this reason, are generally non-ionogenic surfactants which can be used as foam stabilizers, especially for polyurethane foams, as emulsifiers or wetting agents. Where these compounds still contain free hydroxyl groups, they can be directly incorporated into foams where they can simultaneously act as foam stabilizers (cf. British Pat. No. 994,411). The substances according to the invention are also eminently suitable for use as fire-extinguishing agents.

The present invention is illustrated in the following Examples. The products obtained in accordance with

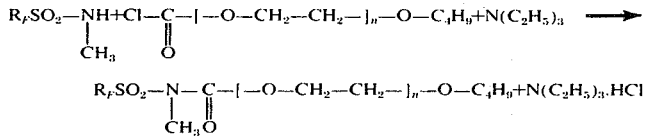

EXAMPLE 1

250 g of the chloroformic acid ester of an ω-monohydroxy-functional polyether containing ethylene oxide and propylene oxide units in a statistical ratio of 1 : 1, end-capped with butanol, having a molecular weight of approximately 1500 and a hydrolyzable chlorine content of 2.2%, were dissolved with 77.4 g of perfluorooctane sulphonamide in 200 ml of anhydrous toluene at a temperature of approximately 60°C, followed by the addition of 22 ml of triethylamine. Triethyl ammonium hydrochloride was immediately precipitated in an exothermic reaction. The reaction temperature was then maintained at about 80°C for 30 minutes, after which the salt precipitated was filtered off and the clear filtrate freed in vacuo (approximately 20 mm Hg) from the solvent in a rotary evaporator. A pale yellow oil was left behind, after prolonged standing solidifying into a wax-like mass.

0.05% of hydrolyzable chloride could still be detected in the reaction product. 95% of the salt separated off consisted of triethyl ammonium hydrochloride.

EXAMPLE 2

250 g of the chloroformic acid ester of an ω-monohydroxy-functional block polyether (ethylene oxide and propylene oxide units in a ratio of 1 : 1, end-capped with butanol, having a molecular weight of approximately 1500 and a hydrolyzable chlorine content of 2.4%) were dissolved with 58 g of N-(β-hydroxyethyl)-perfluorobutane sulphonamide in 250 ml of toluene, followed by the addition of 18 g of triethylamine. The separation of triethyl ammonium hydrochloride was quantitative after only 20 minutes at 80°C. Working up was carried out as in Example 1. The reaction product had a molecular weight of approximately 1800. The triethyl ammonium hydrochloride was obtained in a yield of 96%. A residue of only 0.01% of hydrolyzable chlorine was detected in the reaction product.

EXAMPLE 3

122 g of the chloroformic acid ester of an ω-monohydroxy-functional pure polyethylene oxide ether, also capped with butanol, having a molecular weight of 570 and a hydrolyzable chlorine content of 6.1%, were reacted with 108 g of N-methyl perfluorooctane sulphonamide in 200 ml of toluene and 22 g of triethylamine. The reaction mixture was kept for 20 minutes at 80°C and then worked up in the same way as in Example 1.

EXAMPLE 4

200 g of the same chloroformic acid ester as in Example 1 (hydrolyzable chlorine content 2.2%) were reacted with 63 g of N-methyl perfluorooctane sulphonamide and 18 ml of triethylamine in 250 ml of dry toluene at a temperature of 80°C. The reaction was over after 30 minutes and the reaction product could be worked up in the same way as described in detail in Example 1.

The pale yellow oil had a viscosity η of 340 cP and a refractive index $n_D^{20}$ of 2.4423.

This oil solidified into a wax-like mass after prolonged standing (approximately 1 week).

EXAMPLE 5

148 g of the chloroformic acid ester of an ω-monohydroxy-functional polyether with a statistical distribution of ethylene oxide and propylene oxide units of 1 : 1 in the chain, having an average molecular weight of 578 and a hydrolyzable chlorine content of 5.7%, were reacted with 122 g of N-methyl perfluorooctane sulphonamide and 24 g of triethylamine in 200 ml of absolute toluene at a temperature of 80°C.

The precipitation of triethylammonium hydrochloride was over after 30 minutes and the salt could be isolated in a yield of 98%. Working up was carried out in the same way as described in detail in Example 1. The pale yellow oil had a refractive index $n_D^{20}$ of 1.4153 and a viscosity η of 130 cP.

EXAMPLE 6

This Example demonstrates the effectiveness of the compounds according to the invention as surfactants in various substrates. The depression in surface tension is a measure of the surfactant activity.

| Substrate | Surface tension (Dyn/an) |
|---|---|
| water | 72.0 |
| water + 1% of product of Example 1 | 28.2 |
| water + 1% of product of Example 2 | 31.0 |
| water + 1% of product of Example 3 | 24.4 |
| water + 1% of product of Example 4 | 27.6 |
| Polyester[a] | 58.0 |
| polyester[a] + 1% of product of Example 1 | 38.2 |
| polyester[a] + 1% of product of Example 2 | 50.0 |
| polyester[a] + 1% of product of Example 3 | 33.8 |
| polyester[a] + 1% of product of Example 4 | 38.0 |
| polyether[b] | 39.0 |
| polyether[b] + 1% of product of Example 1 | 35.1 |
| polyether[b] + 1% of product of Example 3 | 36.2 |

[a] = polyester with a hydroxyl number of 60 and an average molecular weight of 2500 obtained by condensing 1.0 mole of adipic acid with 1.24 moles of diethylene glycol and 0.085 mole of trimethylol propane.
[b] = polyether based on glycerol which contains ethylene oxide and propylene oxide units and 63% of terminal primary hydroxyl groups, hydroxyl number 32, average molecular weight 5200.

EXAMPLE 7

This Example demonstrates the effectiveness of the compounds as stabilizers in the production of polyurethane foams.

100 parts by weight of a weakly branched polyester, obtained by condensing 1.0 mole of adipic acid, 1.24 mole of diethylene glycol and 0.085 mole of trimethylol propane (molecular weight 2500, hydroxyl number 60), were reacted with 3.0 parts by weight of water, 1.25 parts by weight of dimethyl benzylamine, 0.5 parts by weight of the compound of Example 1 according to the invention and 40 parts by weight of tolylene diisocyanate (65% of 2,4- and 35% of 2,6-isomer), to form a soft polyester-based polyurethane foam. The foam had a fine pore structure. When the test was repeated without the compound of Example 1, the foam collapsed.

EXAMPLE 8

The test of Example 7 was repeated except that 1.0 part by weight of the compound of Example 2 according to the invention was used as foam stabilizer. Once again, a fine-pored polyester-based polyurethane foam was formed. Without the compound of Example 2, the foam collapsed.

It will be appreciated that the instant specification and examples are set forth by way of illustration and not limitation, and that various modifications and changes may be made without departing from the spirit and scope of the present invention.

What is claimed is:

1. N—(Perfluoroalkyl—sulphonyl)—carbamic acid esters of polyalkylene glycols of the formula

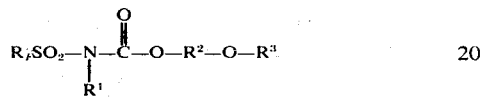

in which:
  $R_F$ is perfluoroalkyl of up to 20 carbon atoms,
  $R^1$ is hydrogen or alkyl of up to about 18 carbon atoms, hydroxy-alkyl of up to about 4 carbon atoms, cycloalkyl of 5 or 6 carbon atoms, alkenyl of up to about 4 carbon atoms, phenyl-substituted alkyl of up to about 4 carbon atoms or alkoxy-lower alkyl of up to about 4 carbon atoms in each alkyl radical, or

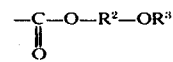

$R^2$ is a polyoxyalkylene radical made up of the structural units $(-CH_2-CH_2-O)_n$ and $(-CH_2-CHCH_3-O)_m$,
  $m$ and $n$ are from 0 to about 200 but are not both simultaneously 0, and
  $R^3$ is alkyl of up to 8 carbon atoms, alkenyl of up to about 4 carbon atoms, phenyl-substituted lower alkyl of up to about 4 carbon atoms, or

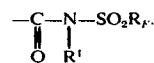

2. Esters as claimed in claim 1, in which:
  $R_F$ is perfluoroalkyl of about 4 to 8 carbon atoms, and
  $R^3$ is lower alkyl.

3. Esters as claimed in claim 2, wherein the sum of $m$ and $n$ is about 2 to 25.

* * * * *